United States Patent [19]

Harris

[11] 3,920,800

[45] Nov. 18, 1975

[54] PRODUCTION OF PURIFIED CALCIUM CARBONATE

[75] Inventor: Dwight L. Harris, Yardley, Pa.

[73] Assignee: Cyprus Mines Corporation, Trenton, N.J.

[22] Filed: Oct. 12, 1973

[21] Appl. No.: 405,843

[52] U.S. Cl. ................. 423/432; 423/161; 423/165
[51] Int. Cl.² ........................................ C01F 11/18
[58] Field of Search ........... 423/155, 158, 160, 161, 423/164, 165, 173, 177, 430, 431, 432

[56] References Cited
UNITED STATES PATENTS

| | | | |
|---|---|---|---|
| 1,936,806 | 11/1933 | Thomas | 423/160 |
| 1,965,268 | 1/1934 | Thomsen | 423/430 |
| 2,581,719 | 1/1952 | Schoenlaub | 423/160 |
| 2,802,719 | 8/1957 | Auedikian | 423/432 |
| 2,825,626 | 3/1958 | Spence | 423/164 |
| 3,708,266 | 1/1973 | Gustavsson | 423/242 |

FOREIGN PATENTS OR APPLICATIONS 268,963  6/1968  U.S.S.R. .................... 423/164

OTHER PUBLICATIONS

Glasson, P. R., Reactivity of Lime and Related Oxides IV: Carbonation of Lime, Appl. Chem. 10, Jan., 1960, pp. 42–48.

*Primary Examiner*—Oscar R. Vertiz
*Assistant Examiner*—Gary P. Straub
*Attorney, Agent, or Firm*—Woodcock, Washburn, Kurtz & Mackiewicz

[57] ABSTRACT

Process for producing pure calcium cabonate which comprises generating carbonate ions in an aqueous slurry of calcium hydroxide contained in an attrition zone, and simultaneously grinding the solids in the slurry as the reaction progresses to convert all of the calcium hydroxide present into substantially pure calcium carbonate. According to a preferred form of the invention, aragonite is calcined into lime, and the lime is slaked to provide an aqueous slurry of calcium hydroxide. The slurry is then carbonated in a attrition milling-carbonation zone which includes particulate grinding media adapted to abrade the calcium carbonate particles as they are being formed in the slurry. The slurry in the attrition milling-carbonation zone is continuously attrition milled and, concurrently with the attrition milling of the slurry, gaseous carbon dioxide is passed into the slurry to generate carbonate ions for reaction with the calcium hydroxide until all of the calcium hydroxide in the slurry has been converted into reformed calcium carbonate. Substantially pure calcium carbonate, characterized by a GE brightness of 100, is then recovered from the attrition milling-carbonation zone. By maintaining the temperature in the zone during the combined grinding-carbonation within the range of from 30° to 80°C., a pure calcium carbonate characterized by a predetermined particle size may be obtained.

2 Claims, 3 Drawing Figures

PRODUCTION OF PURIFIED CALCIUM CARBONATE

BACKGROUND OF THE INVENTION

1. Field of the Invention

This invention relates to the production of purified calcium carbonate, and more particularly is concerned with a process for rapidly producing a pure, calcium hydroxide-free calcium carbonate product having, if desired, a predetermined particle size.

2. Description of the Prior Art

Calcium carbonate in finely divided form is a well known, commercially available material having a variety of technological applications. It has for some time been used to impart brightness and opacity to paper, and as a reinforcing agent or filler in rubber. In addition, so called precipitated calcium carbonate has been used in the cosmetic field as a filler or pigment in creams, lipsticks, ointments and various other skin preparations. Pigment grade calcium carbonate is used as a pigmentary material in paints and printing inks as well as in the production of synthetic tile flooring and leather.

Generally speaking, calcium carbonate is found in nature in the form of limestone, which is the most common calcium compound on earth, with calcium being the fifth most abundant element. Exclusive of impurities, limestone can be composed of three minerals: calcite, a rhombohedral calcium carbonate crystal; aragonite, an orthorhombic calcium carbonate crystal; and dolomite, a rhombohedral calcium-magnesium carbonate crystal. Aragonite under most conditions is not as stable as the other minerals and tends in time to recrystallize into calcite.

Limestone in its natural state is not directly suitable in many applications requiring calcium carbonate because of the impurities the limestone contains and the difficulty in reducing the natural limestone to particles having the desired size. Accordingly, it has been the practice to purify limestone and produce calcium carbonate having the desired impurity level and particle size.

In general, the purification commences with the calcining of the limestone whereby carbon dioxide gas is evolved and the organic matter present is removed. Classification procedures are next used to remove the coarse aggregates and the resulting calcium oxide is slaked or hydrated, to produce milk-of-lime, a suspension of finely divided calcium hydroxide in water. This calcium hydroxide slurry is then treated to produce calcium carbonate in finely divided form.

Three common methods have been employed commercially to recover the calcium values from the milk-of-lime or calcium hydroxide slurry. In the carbonation process, carbon dioxide gas is bubbled through the milk-of-lime to produce calcium carbonate and water according to the reaction $$Ca(OH)_2 + CO_2 \rightarrow CaCO_3 + H_2O$$

In the lime soda process, sodium carbonate is reacted with the milk-of-lime to produce calcium carbonate and sodium hydroxide according to the reaction $$Ca(OH)_2 + Na_2CO_3 \rightarrow CaCO_3 + 2NaOH$$

The third process, or calcium chloride process, involves first reacting the milk-of-lime with ammonium chloride to form calcium chloride, ammonia and water according to the reaction $$Ca(OH)_2 + 2NH_4Cl \rightarrow CaCl_2 + 2NH_3 + 2H_2O$$

The ammonia is removed by heat and the remaining calcium chloride solution, after purification, is reacted with a soda ash solution to form calcium carbonate:

$$Na_2CO_3 + CaCl_2 \rightarrow CaCO_3 + 2NaCl$$

The art has concentrated upon refinements on these basic commercial processes in order to produce calcium carbonate having the desired fineness, purity and brightness. See, for example, U.S. Pat. Nos. 1,188,505 — Statham; 1,975,214 — MacIntire; 2,058,503 — Rafton et al; 2,231,965 — Stump; and 2,414,980 — Schoenlaub. See also Boynton, Chemistry and Technology of Lime and Limestone (1966). A good discussion of the various approaches that have been suggested in the prior art is found in U.S. Pat. No. 2,964,382 — Hall which describes a process for preparing finely divided, precipitated calcium carbonate by reacting calcium ions and carbonate ions in a precipitation zone and simultaneously imparting to the calcium carbonate slurry being formed high shear, intense turbulence and linear velocity of at least 1160 feet per minute.

U.S. Pat. No. 2,802,719 — Avedikian discloses a process for producing a highly pure (substantially 100%) calcium carbonate product by grinding or pulverizing partly carbonated lime into a fluidized state which appears as a dense cloud around the grinding balls in a ball mill. This cloud is heated to a temperature of between 210°F. to 600°F. (preferably 300° to 450°F.) and a mass of water droplets are propelled into the heated cloud to vaporize the water droplets and react the cloud of hot particles of partly carbonated lime with carbon dioxide in the presence of nascently formed steam. This is essentially a dry process, requiring elevated temperatures and is accordingly unattractive from a commercial standpoint, particularly where hundreds of thousands of tons of calcium carbonate are to be produced annually.

Pope et al U.S. Pat. No. 3,150,926 describes a method for producing alkaline earth metal carbonates by carbonating a mechanically fluidized bed of an alkaline earth metal hydroxide while in the form of a moist, but powdery or pulverant state. The carbonate is obtained in a moist powdery condition. In effect, the carbonate has, in the process described by the patentees, been precipitated in the solid state. The process does not achieve a complete carbonation of the lime, however, and measurable traces of lime are found in the calcium carbonate product, as reported by the patentees.

Thus, while numerous attempts have been made to produce purified calcium carbonate, no reliable, commercially attractive process has, to the best of my knowledge, been developed for economically producing ultra-high purity calcium carbonate, that is to say, calcium carbonate which is free of any trace of calcium hydroxide and which is characterized by a GE brightness above 99, a predetermined particle size, and a low abrasion value.

It is accordingly a primary object of the invention to provide an improved process for efficiently and economically producing calcium carbonate having the desired purity, brightness and low abrasion characteristics.

SUMMARY OF THE INVENTION

Briefly stated, the process according to the invention comprises generating carbonate ions in an attrition zone including an aqueous slurry of calcium hydroxide maintained at a temperature below 100°C. and simultaneously grinding the solids in that slurry to convert all of the calcium hydroxide to calcium carbonate, and recovering substantially pure calcium carbonate from the slurry. In accordance with one aspect of the invention, the slurry temperature is maintained in the range of from 30° to 80°C. to provide a reformed calcium carbonate product characterized by a predetermined particle size.

Unexpectedly, it has been discovered that when a calcium hydroxide slurry is carbonated, as by the addition of carbon dioxide to the slurry, for example, and the solids in the slurry are simultaneously subjected to a grinding operation, the reaction between the calcium ions in the slurry and the carbonate ions (formed by passing the $CO_2$ gas into the aqueous slurry) will proceed to a rapid completion to provide a calcium carbonate product which is free of any calcium hydroxide. In this connection, it has been found essential to effect the generation of carbonate ions and the grinding of the solids in the slurry concurrently, or simultaneously, in order to achieve the desired results of the invention. Further, it has been found that intense agitation of the slurry, absent the grinding of the slurry solids, will not produce a calcium hydroxide-free product in any commercially practicable reaction time. Whereas the process of the invention involving the combined or simultaneous grinding-carbonation will be complete within a matter of minutes, the carbonation of a intensely agitated slurry was found to be incomplete after many hours of reaction.

The process of the invention may easily and conveniently be achieved by carbonating the calcium hydroxide slurry in an attrition zone, such as, for example, a suitable attrition mill including grinding media adapted to grind the solids in the slurry which is to be carbonated in accordance with the invention. The grinding media may be in the form of beads having diameters preferably ranging from about 1 mm to about 10 mm and may be formed of, for example, steel, alundum ($Al_2O_3$), nylon or glass. Such mills, including flow connections for passing gas into the attrition zone defined by the interior walls of the attrition mill, and suitable temperature regulating means, such for example as a temperature jacket, are well known in the art. Examples of suitable mills are Sussmeyer sandmills sold by the Premier Mill Corporation of New York, New York.

An important feature of the invention resides in the discovery that despite the grinding of the solids in the slurry during the carbonation reaction, the particle size of the final calcium carbonate product can be carefully regulated within a predetermined range by adjusting and maintaining the temperature of the slurry at a predetermined value. In this connection, the process of the invention enables the production of calcium hydroxide-free calcium carbonate characterized by surface areas ranging from less than 6 square meters per gram to about 25 square meters per gram. It has been found in this regard that lower temperatures, i.e. temperatures of the order of 30°C., will produce the finer particle size calcium carbonate whereas higher temperatures, i.e. of the order of 80°C., will result in larger particles.

It has further been found that a particularly outstanding candidate raw material useful in the practice of the invention is the oolitic aragonite sand which has precipitated from sea water on some 60,000 square miles of submerged limestone plains that constitute the Great Bahamas Bank opposite Southeast Florida. These aragonite deposits are almost entirely free of the ferruginous materials that contaminate the much older limestone on and under land. Aragonite precipitates as spheroidal pellets in elongated bars. An average chemical analysis of 97.9% calcium carbonate qualifies such aragonite as a chemical-grade limestone.

In accordance with the invention limestone is processed into lime by calcining and converting the limestone in accordance with the following reaction:

$$CaCO_3 \rightarrow CaO + CO_2$$

The limestone may be prepared for calcination by crushing the mined limestone and passing it over a screening device to size it in a particular range dependent upon the kind of calciner used. Generally speaking, the materials finer than 100 $\mu$ (micro meters) are removed from the feed material to avoid excessive dusting in a rotary kiln type of calciner. Where aragonite sand is used as the source of calcium carbonate, a simple sorting step is generally all that is required since the material as obtained in its original form generally has a particle size ranging of from 100 $\mu$ 850 $\mu$.

The calcination of the limestone has a twofold effect. First, by calcining at elevated temperatures the organic matter present in the limestone is removed. Secondly, the calcination effects a conversion of the carbonate present to the oxide, i.e. the calcium carbonate is transformed into lime.

Calcination may be conducted at temperatures ranging between 825° to 1500°C. and preferably at a temperature of the order of 1040°C.

A rotary, direct fired calciner may be used although other types of kilns can be used.

The retention time of the limestone in the calciner is a function of the temperature of the calciner, and at a temperature of 1040°C. a period of about 2 hours has been found satisfactory.

After the limestone has been calcined, it is passed into the slaking area where water is brought into contact with the calcium oxide to form milk-of-lime. Sufficient water is added to form a slurry leaving a total calcium hydroxide content ranging from about 5% to about 70% by weight, and preferably from about 20% to 30% by weight. The milk-of-lime is next screened to remove particles in excess of 74 micrometers for recycling to the kiln feed. The aqueous slurry including the finer particles of calcium hydroxide is then passed into the attrition zone for carbonation. This may be achieved by passing carbon dioxide gas into the attrition zone including the calcium hydroxide slurry and simultaneously grinding the contents in the attrition zone to continuously and concurrently effect a complete conversion of the calcium hydroxide into the desired calcium carbonate. Carbonation is continued until the pH of the slurry reaches a value of from 9.9 to 11.0, which is characteristic of the carbonate. Any residual calcium hydroxide would cause a pH of higher value (12 to 12.5), an undesired characteristic in the carbonate product. Upon completion of the carbonation reaction, the grinding of the slurry solids is terminated and the resulting carbonate product filtered, dried, and bagged. Alternatively, the slurry can be filtered to remove some of the water and a high solids content slurry may be fed directly to tank cars for use in processes requiring the calcium carbonate to be in slurry form.

For further objects and advantages of the invention and for a more detailed discussion of some of the preferred embodiments thereof, reference is to be had to the following description taken in conjunction with the accompanying drawings in which.

Figure 1:
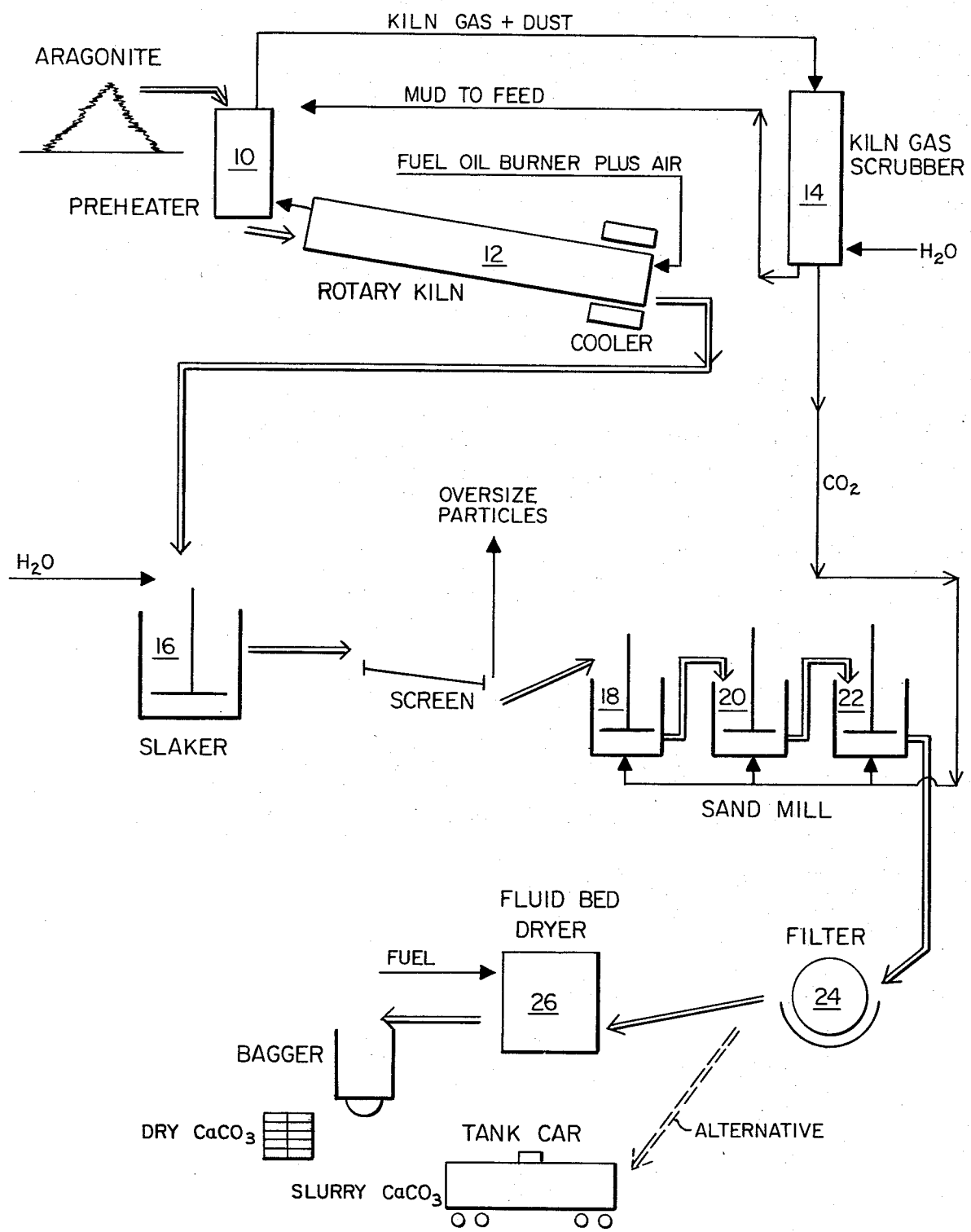
FIG. 1 shows a diagramatic flow sheet of the invention in one form.

FIG. 1 illustrates a particular embodiment of the invention wherein aragonite sand is used as the starting limestone material. The aragonite sand after suitable screening is first fed into a preheater 10 to raise the temperature of the feed to the rotary kiln 12. The preheater 10 is heated by the exhaust gases from the fuel oil burner (not shown) used to heat the rotary kiln 12.

The aragonite sand is passed into the rotary kiln 12 at an initial temperature in the range of 300° to 500°C. and is retained in the kiln for a period of approximately 2 hours, at a temperature of the order of 1040°C. The kiln gas plus dust emerging from the rotary kiln 12 are used to heat the aragonite in the preheater 10, and are then passed into a kiln gas scrubber 14 in countercurrent flow with water which serves to remove the fine dust particles. The fine particles in the form of mud are returned to the preheater for recycling into the rotary kiln 12.

Upon completion of calcining in kiln 12, the product is first cooled to a temperature below 500°C. and is then transported to a suitable slaking zone where the calcium oxide is contacted with water to form milk-of-lime, i.e. a slurry of calcium hydroxide in water. The amount of water added to the slaker 16 is such as to maintain the temperature of the mixture near the boiling of water, i.e. between 80° and 100°C.

The milk-of-lime or calcium hydroxide slurry emanating from slaker 16 is next screened and particles in excess of 74 micrometers are recycled to the kiln feed. The remaining slurry is then passed into the attrition zone, which is shown in FIG. 1 as a three stage sandmill, including stages 18, 20 and 22. As will be appreciated by those skilled in the art, the number of stages used can be varied and the three stages shown are for purposes of illustration only. Each sand mill includes suitable grinding media such as, for example, grinding pebbles of alundum, nylon or other suitable material capable of grinding the solids in the calcium hydroxide slurry passed into the attrition zone defined by the mill walls.

The screened slurry of calcium hydroxide is first passed into stage 18 where the slurry is subjected to an attrition milling operation and, concurrently with the attrition milling, carbon dioxide gas is passed into the slurry to generate carbonate ions for reaction with the calcium ions. The product of the first stage is passed into the next stage, 20, where the slurry is continuously attrition milled and simultaneously carbonated. This is repeated again in the third stage, 22, wherein a complete conversion of all of the calcium hydroxide present in the slurry is attained and the resulting slurry product emanating from stage 22 comprises a slurry of pure calcium carbonate particles in water.

As shown in FIG. 1, the gases emanating from kiln gas scrubber 14 (containing about 20% by volume of $CO_2$ including the carbon dioxide generated during the course of the calcining operation as well as carbon dioxide generated as a result of the burning of the fuel oil used to heat the rotary kiln) are used as the source of carbon dioxide passed into each of the attrition zones 18, 20 and 22. As will be appreciated by those skilled in the art, either pure carbon dioxide or a gaseous mixture of carbon dioxide with air can be passed into the attrition zone for recarbonation of the calcium hydroxide and recovery of all of the calcium values in the form of calcium carbonate.

In accordance with a further aspect of the invention, the temperature of the slurry in the combined grinding-carbonation zone can be maintained at a predetermined temperature in order to preselect the particle size of the final calcium carbonate product. More specifically, the relationship of slurry temperature and the particle size of the calcium carbonate produced in accordance with the process of the invention is set forth in Table I below.

TABLE I

| TEMPERATURE EFFECT ON PARTICLE SIZE | |
|---|---|
| Temperature °C. | Surface Area m²/g |
| 80 | 5.9 |
| 70 | 8.2 |
| 60 | 8.4 |
| 50 | 9.9 |
| 40 | 12.0 |
| 30 | 26.2 |

100% Reacted to $CaCO_3$.
Time = 20 min. Reaction.
100% $CO_2$ gas composition used.

The resulting slurry emanating from the final stage 22 of the attrition zone is next passed into a suitable filter 24 to remove the water from the calcium carbonate product which is then dried in a suitable fluid bed dryer 26 and the product bagged for shipment. Alternatively, only a portion of the water can be removed from the slurry and a relatively high solids content slurry pumped directly into tank cars for shipment and use in applications where calcium carbonate in slurry form is desired.

In order to demonstrate the advantages which acrue in accordance with producing calcium carbonate by the process of the invention, a series of tests were conducted for carbonating a calcium hydroxide slurry in a SME-Mark II sand mill sold by the Premier Mill Corporation of New York, New York. The tests were conducted at temperatures varying form 15° to 80°C. using a 150 gram charge of calcium hydroxide, 340 ml. of water, and 750 grams of alundum ($Al_2O_3$) balls having diameters of the order of 1 mm. Carbon dioxide was bubbled into the slurry while it was undergoing attrition to maintain a very fine dispersion of solids in the slurry. Calculations indicated that the carbon dioxide gas is completely reacted as quickly as it enters the grinding-carbonation zone, i.e. comes into contact with the calcium hydroxide slurry, and that the limit of reaction rate may be the mechanical limit imposed by gas delivery, cell proportions and proper grinding action.

The following data were obtained:

| Carbonation Time In Minutes | Percent Calcium Hydroxide Reacted |
|---|---|
| 0 | 0 |
| 5 | 55 |
| 10 | 99+ |
| 15 | 100 |
| 20 | 100 |

The reaction extent was determined by x-ray diffraction of periodic samples of slurry taken.

To compare the process of the invention with prior art processes a carbonation test was effected in a carbonation zone wherein the slurry was undergoing agitation only. Without grinding, a 20% solids content calcium hydroxide slurry was carbonated in a reactor including a magnetic stirring bar to cause agitation of the slurry during the carbonation reaction. The following data were collected:

| Carbonation Time In Hours | Percent Of Total Calcium Hydroxide Reacted To Calcium Carbonate |
|---|---|
| 1.3 | 10 |
| 6.6 | 30–35 |
| 9.5 | 45 |
| 14.5 | 65 |
| 22.5 | 85 |
| 48.0 | 95 |

Figure 2:
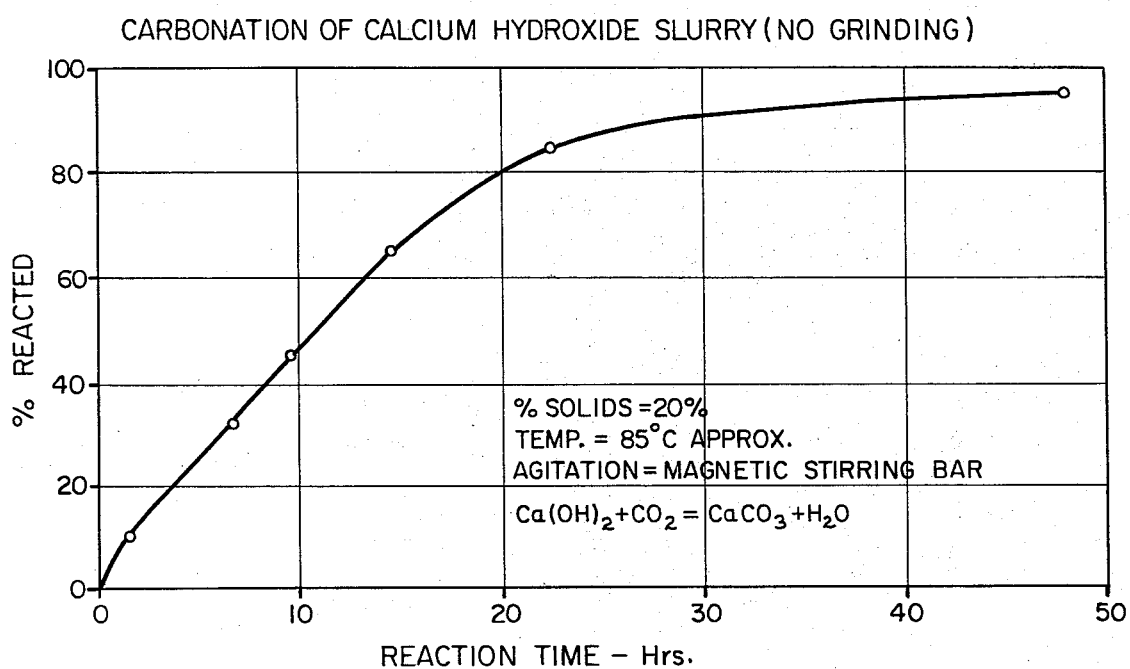
FIG. 2 is a chart illustrating the relationship between the reaction time and the percent of calcium hydroxide reacted when carbonated in accordance with the methods of the prior art.
Figure 3:
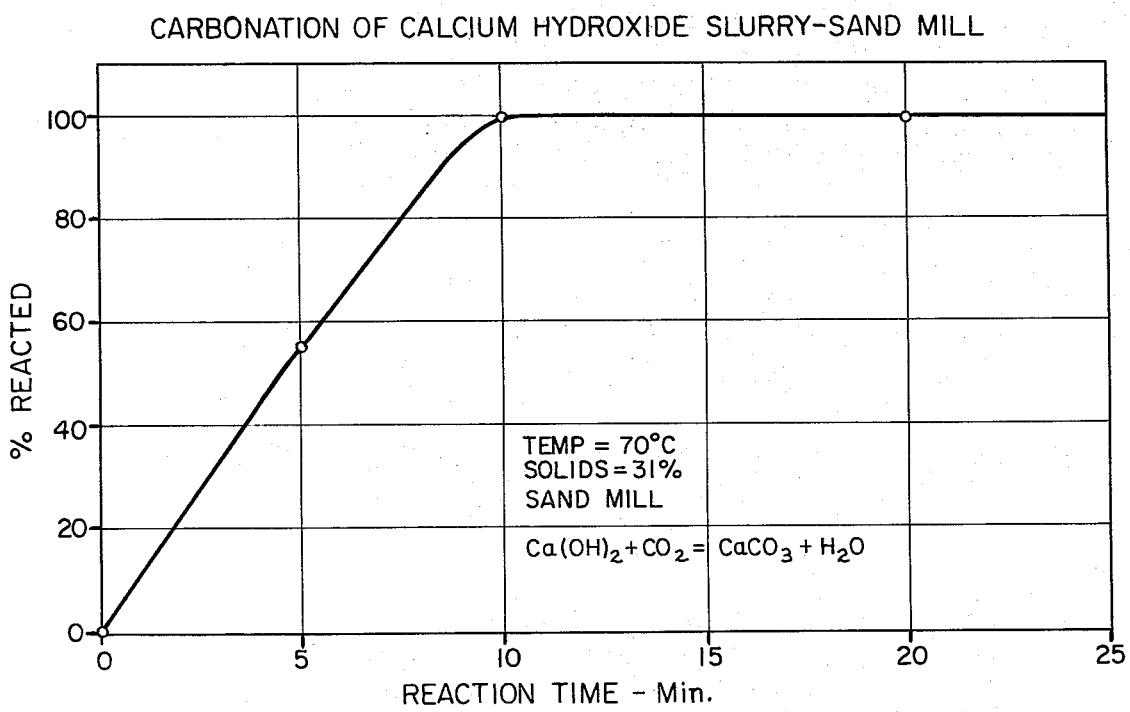
FIG. 3 is a chart illustrating the relationship of the reaction time with percent of calcium hydroxide reacted when carbonated in accordance with the process of the invention.

The data from the foregoing tests are graphically illustrated in FIGS. 2 and 3 wherein FIG. 2 shows the relationship of the percent calcium hydroxide reacted with reaction time in a process wherein the calcium hydroxide slurry agitated during carbonation, but absent any grinding. As shown in FIG. 2, after 40 hours of reaction time, only 94% of the calcium hydroxide reacted to form calcium carbonate. On the other hand, FIG. 3, which displays the relationship between the percent of calcium hydroxide reacted and the reaction time in a process performed in accordance with the invention shows that after about 10 minutes of reaction, virtually all of the calcium hydroxide had been converted into calcium carbonate.

The product obtained in accordance with the invention is substantially pure calcium carbonate which is free of any traces of calcium hydroxide. In addition, the invention provides and efficient and reliable means for preselecting the desired particle size of the calcium carbonate product simply by regulating the temperature at which the combined carbonation-grinding operation is performed. The brightness of the calcium carbonate obtained in accordance with the invention will have a GE value in excess of 99, and GE brightness values of 100 are often realized. In addition, the product of the invention is characterized by a very low level of abrasiveness. In fact, the abrasive values of calcium carbonate produced in accordance with the invention will vary form 2.6 to 5.3 reported as milligram loss in wire weight when tested by the Valley Iron Works Abrasion tester. This abrasion tester rubs a slurry of the test material over the surface of a paper machine wire, thus causing the wire to wear. The equipment consists essentially of a frame to support the wire and to prevent its movement, a circulating system to furnish a continuous supply of the test material to the upper surface of the wire, a perforated Micarta block to distribute the test material over the surface of the wire, and a suitable motor arrangement to operate the circulating pump and move the block back and forth across the surface of the wire. It is the sliding action of the weighted block on the wire, with the test material at the interface, which causes the wire to wear. By this test, materials characterized by abrasiveness values below 20 milligrams are considered to be very low abrasive materials.

Although the present invention has been described in considerable detail with respect to certain embodiments thereof, it should be understood that the invention is not deemed to be so limited and is to be interpreted by the scope of the appended claims.

What is claimed is:

1. In the process for producing calcium carbonate including the generation of carbonate ions in a reaction zone for reaction with calcium ions in an aqueous slurry of calcium hydroxide contained in said zone, the improvement which comprises:

generating said carbonate ions by addition of carbon dioxide gas into said slurry for a period not exceeding twenty minutes until the pH of said slurry is in the range of from 9.9 to 11.0, said carbonation zone including particulate grinding media comprising grinding balls having diameters of the order of 1mm., said calcium hydroxide component of said slurry being in the form of fine particles having a particle size not exceeding 75 micro meters, maintaining said slurry at a temperature in the range of from 30°C. to about 80°C. throughout the period of addition of said carbon dioxide gas to said slurry, concurrently with the generation of said carbonate ions continuously grindng the solids in said slurry to convert all of said calcium hydroxide into calcium carbonate, and recovering substantially pure calcium carbonate from said slurry in the form of fine particles characterized by a surface area in the range of from about 6 to about 26 square meters per gram and being free of any traces of calcium hydroxide.

2. The process of claim 1 wherein said calcium hydroxide content initially ranges from about 5% to about 70% of the total weight of water and calcium hydroxide in said slurry.

* * * * *